Figure 1:
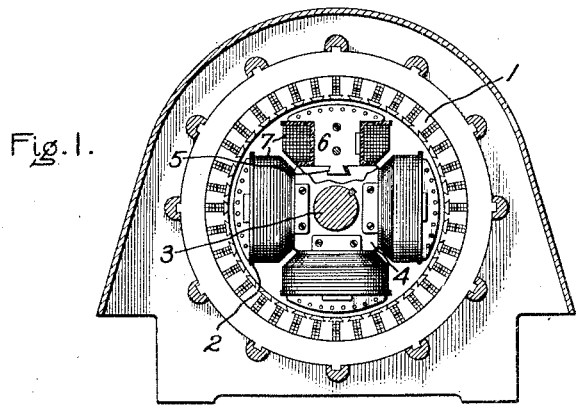

Oct. 20, 1931.  L. W. RIGGS  1,828,578

SYNCHRONOUS MOTOR

Filed Nov. 9, 1929

Inventor:
Leland W. Riggs.
by Charles E. Mullen
His Attorney.

Patented Oct. 20, 1931

1,828,578

UNITED STATES PATENT OFFICE

LELAND W. RIGGS, OF SCHENECTADY, NEW YORK, ASSIGNOR TO GENERAL ELECTRIC COMPANY, A CORPORATION OF NEW YORK

SYNCHRONOUS MOTOR

Application filed November 9, 1929. Serial No. 406,033.

My invention relates to synchronous motors and more particularly to synchronous motor rotor structures of the type provided with squirrel cage bars for starting purposes.

In synchronous motors of the high speed type it is very difficult to use the conventional squirrel cage continuous end rings, due to the necessity of conserving space and of providing mechanically safe supporting structure for normal high speed operation. It is therefore not only desirable but customary in many cases to use segmental or open end rings connecting together only the squirrel cage bars of the individual rotor poles. In this arrangement the only electrical connection between the respective bars of adjacent poles is through the uncertain path from the bars of one pole through the metal of that pole and across the spider to the adjacent pole and bars. With this particular design of squirrel cage rotor construction, the rotating stator flux when it is opposite in the interpolar space during the starting period, induces circulating current in the bars of each pole separately. As there is no single current path linking the entire flux, as in the case where the flux is along the main or pole axis, these induced currents must flow and return along the horizontal axis of each individual pole instead of along the bars in one pole and returning through the bars in the adjacent pole, as where the continuous end ring is used. This greater length of path, together with ineffective distribution of the induced currents, results in a much higher effective impedance than where a continuous end ring is used. This is advantageous in one respect in that it results in a lower starting current, but it presents a serious difficulty due to the fact that the high impedance of the squirrel cage construction along the cross axis or interpolar space differs so much from the comparatively low impedance along the main axis that the arrangement during the starting period simulates the behavior of a single phase rotor. The cross axis impedance is high, not only because of the longer and less effective squirrel cage current paths in the cross axis, but also because a considerable amount of flux in this axis flows into the outer and lower surfaces of the pole tips and does not link any short circuited bars whatever.

In other words, the well known tendency of an induction motor with a single phase rotor to "crawl" or "stick" at half speed concurrent with low frequency pulsations of considerable magnitude of the primary current, is present when the impedances of the squirrel cage bars vary considerably with respect to the cross and main axis. In salient pole synchronous motors having segmental end ring squirrel cage windings, this single phase effect may be great enough to cause an objectionable dip in the motor torque-speed curve at about half speed, this effect being particularly severe in high speed machines. Another objectionable feature of this construction is that of sparking due to the high voltages induced in the cross axis when the cross axis flux is unopposed by squirrel cage currents, which results in sparking from the bars to the pole punchings during the starting period. These high voltages are caused by the main part of the flux linking the entire group of squirrel cage bars in a pole, thereby producing the effect of the flux in linking a single conductor.

In order to avoid these effects it has been customary to provide some form of electrical connection between adjacent poles, as by providing each pole with copper end punchings connected to the squirrel cage bars, the copper end punchings being connected at the dove-tail union with continuous end rings encircling the rotor shaft beneath the field coils. This last-described arrangement, however, involves greater construction costs and precludes a simplified structure.

A principal object of my invention is to provide an improved rotor construction for synchronous motors having starting windings embodying the segmental or open end ring principle wherein the tendency of the rotor to "crawl" or "stick" at about half speed is practically eliminated, and wherein sparking from the pole face bars to the pole punchings during the starting period is precluded.

A further object of my invention is the provision of an improved and simplified rotor construction for synchronous motors having starting windings embodying the segmental or open end ring principle wherein a continuous conducting circuit linking substantially all of the cross axis flux is provided for each individual pole.

My invention will be more fully set forth in the following description referring to the accompanying drawings, and the features of novelty which characterize my invention will be pointed out with particularity in the claims annexed to and forming a part of this specification.

Figure 2:
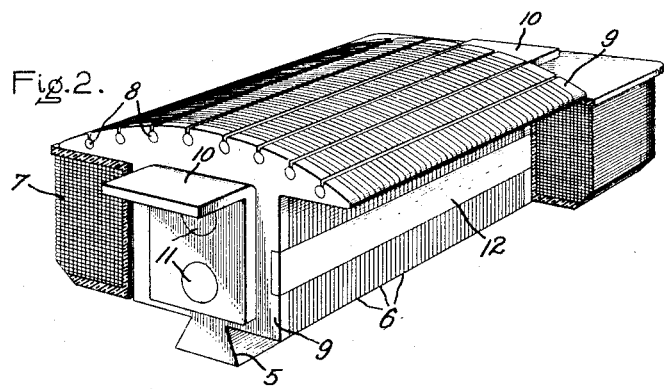

Referring to the drawings, Fig. 1 illustrates an elevational view, partly in section, of a synchronous motor embodying my invention; Fig. 2 illustrates an enlarged perspective view, partly in section, of the pole construction shown in Fig. 1, and Fig. 3 is a partial end view, in section, of the stator and rotor construction.

Figure 3:
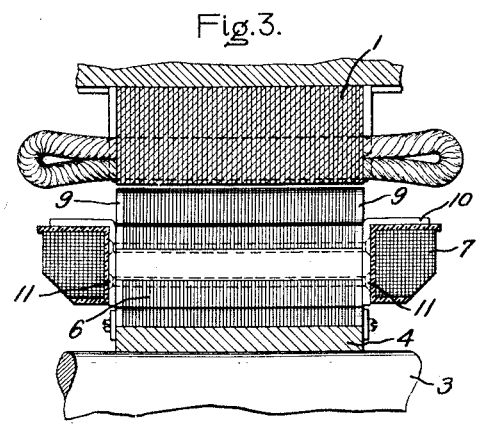

In Figs. 1 and 3 there is illustrated a synchronous motor comprising a stator 1 and a rotor 2 of the open end ring type. The rotor shaft 3 has keyed thereon the spider 4 in which are dove-tailed, as at 5, in the usual manner the pole punchings or laminæ 6. In the present instance the rotor comprises 4 poles whose polarities are determined by the field coils 7 mounted in the usual manner with respect to the individual poles.

Referring more particularly to Fig. 2, the face of each individual pole is provided with the squirrel cage bars 8 of a material such as copper, these bars being connected at their opposite ends to the end segments or punchings 9 likewise of material such as copper. For the purpose of retaining the field coil 7 in proper position, retaining lugs or flanges 10 are secured to the opposite ends of the pole in any suitable manner, as by through-bolts 11. In the construction so far described there is no satisfactory electrical connection between the bars 8 of adjacent poles. The currents induced in the poles when the rotating flux is in the interpolar space must therefore take a comparatively long circuit comprising the length of the pole and return. The resulting higher impedance of the squirrel cage construction would cause the rotor to "crawl" at about half speed unless additional means is provided, as electrical connections from the end punchings to a continuous conducting ring around the rotor shaft. Furthermore, the comparatively high voltages induced in each group of squirrel cage bars due to the linking of the bars as a unit by the cross axis flux would cause objectionable sparking during the starting period of the motor.

For the purpose of eliminating the above disadvantages there is provided in each pole an electrical connection, as a bar 12 of material such as copper, extending longitudinally along a side of the pole beneath the pole tips and electrically connecting the end punchings 9. There is accordingly provided a continuous uniformly conducting circuit for linking the cross axis flux comprising the bars 8, the end punchings 9, and the connection 12. The currents now induced in the squirrel cage bars 8 by the rotating flux during the starting period do not need to flow through the bars of the adjacent pole, or through part of the bars of the same pole to complete the circuit, but instead, are short circuited through the connection 12 so that the impedance of the circuit is not appreciably greater along the cross axis than along the main axis. This short circuiting connection linking substantially all of the cross axis flux therefore serves to lower the impedance with respect to the cross axis in a manner well known in the art.

There will be therefore very little tendency on the part of the rotor to "crawl" at half speed, due to the more balanced impedance of the squirrel cage circuits, and the rotor will be brought up to synchronous speed more readily. Also the tendency toward sparking during the starting period is overcome due to the fact that the cross axis flux may be opposed by currents induced in the squirrel cage bars.

It shall be understood that my invention is not limited to the specific details of construction and arrangement thereof herein illustrated, and that modification and changes will occur to those skilled in the art without departing from the spirit of my invention.

What I claim as new and desire to secure by Letters Patent of the United States is:—

1. In a synchronous motor comprising a rotor of the open end ring type, a starting winding incorporated solely in the individual poles of the rotor comprising electrical conducting means forming a circuit for linking substantially all of the cross axis flux whereby the rotor impedances with respect to the cross and main axes are substantially balanced.

2. In a synchronous motor comprising a rotor of the open end ring type, a starting winding incorporated in each of the individual pole structures of the rotor comprising a short circuiting connection for the currents induced in the pole face by substantially all the cross axis flux.

3. In a synchronous motor comprising a rotor of the open end ring type, a starting winding comprising bars disposed in the pole face of each pole of the rotor, conducting end members for connecting the bars to each other at opposite ends of the pole, and a connection on one side of said pole spaced from a pole tip for electrically connecting said end members.

4. In a synchronous motor comprising a rotor of the salient pole, open end ring type, a starting winding comprising squirrel cage bars disposed along the face of each pole, end punchings of conducting material for connecting the corresponding ends of said bars at opposite ends of each pole, and a conductor disposed along the side and appreciably beneath the tips of each pole for connecting said end punchings whereby currents induced in the squirrel cage bars are short circuited.

5. The combination with a synchronous motor comprising a rotor of the salient pole type, of a starting winding of the open end ring type for said rotor comprising electrical conductors forming a short circuiting connection in each pole for linking substantially all of the cross axis flux.

In witness whereof, I have hereunto set my hand this 8th day of November, 1929.

LELAND W. RIGGS.